United States Patent
Lacko

(10) Patent No.: US 10,759,541 B2
(45) Date of Patent: Sep. 1, 2020

(54) NACELLE BIFURCATION WITH LEADING EDGE STRUCTURE

(71) Applicant: Rohr, Inc., Chula Vista, CA (US)

(72) Inventor: Anthony Lacko, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 876 days.

(21) Appl. No.: 15/294,004

(22) Filed: Oct. 14, 2016

(65) Prior Publication Data

US 2018/0215477 A1    Aug. 2, 2018

(51) Int. Cl.
*B64D 27/26* (2006.01)
*F02C 7/20* (2006.01)
*B64D 29/06* (2006.01)

(52) U.S. Cl.
CPC ............ *B64D 27/26* (2013.01); *B64D 29/06* (2013.01); *F02C 7/20* (2013.01); *Y02T 50/671* (2013.01)

(58) Field of Classification Search
CPC ........... B64D 27/26; B64D 29/06; F02C 7/20; Y02T 50/671
USPC .......................................................... 244/54
See application file for complete search history.

(56) References Cited

U.S. PATENT DOCUMENTS

| | | | | |
|---|---|---|---|---|
| 4,044,973 A | * | 8/1977 | Moorehead | B64D 27/20 244/54 |
| 4,283,028 A | * | 8/1981 | Wilke | B64D 29/06 244/54 |
| 4,826,106 A | | 5/1989 | Anderson | |
| 5,136,839 A | | 8/1992 | Armstrong | |
| 5,174,525 A | | 12/1992 | Schilling | |
| 5,239,822 A | | 8/1993 | Buchacher | |
| 5,251,435 A | * | 10/1993 | Pauley | B64D 29/00 244/54 |
| 5,467,941 A | * | 11/1995 | Chee | B64D 27/18 244/54 |
| 5,833,140 A | * | 11/1998 | Loffredo | F02K 1/11 239/265.37 |
| 5,887,822 A | * | 3/1999 | Thornock | B64D 33/04 244/53 R |
| 5,906,097 A | * | 5/1999 | Hebert | B64C 23/00 244/53 R |
| 8,172,176 B2 | | 5/2012 | Welch et al. | |
| 8,911,203 B2 | * | 12/2014 | Reinhardt | F01D 25/28 415/122.1 |

(Continued)

FOREIGN PATENT DOCUMENTS

| | | | | |
|---|---|---|---|---|
| EP | 2543864 A2 | * | 1/2013 | ............ B64C 7/02 |
| EP | 3045708 A1 | * | 7/2016 | ............ B64D 27/12 |

(Continued)

OTHER PUBLICATIONS

Victor Birman, "Modeling and Analysis of Functionality Graded Materials and Structures", Applied Mechanics Reviews, vol. 60, pp. 195-216, ASME, Sep. 2007, downloaded from http://www.ewp.rpi.edu/hartford/~ernesto/F2011/EP/MaterialsforStudents/Saunders/modeling%26analysis.pdf.

(Continued)

*Primary Examiner* — Christopher P Ellis
(74) *Attorney, Agent, or Firm* — Getz Balich LLC

(57) ABSTRACT

An assembly is provided for an aircraft propulsion system. The assembly includes a tubular inner housing, a tubular outer housing and a bifurcation. The bifurcation includes a leading edge structure structurally connected to the inner housing and the outer housing.

11 Claims, 10 Drawing Sheets

(56) References Cited

U.S. PATENT DOCUMENTS

| | | | |
|---|---|---|---|
| 9,366,202 B2 | 6/2016 | Lacko | |
| 2006/0038065 A1* | 2/2006 | Howe | B64D 27/26 244/54 |
| 2008/0028763 A1* | 2/2008 | Schwarz | F01D 15/10 60/771 |
| 2008/0073460 A1* | 3/2008 | Beardsley | B64D 27/26 244/54 |
| 2008/0302907 A1* | 12/2008 | Schafer | F01D 17/02 244/54 |
| 2009/0071122 A1* | 3/2009 | Maguire | F02C 7/20 60/226.2 |
| 2009/0188232 A1* | 7/2009 | Suciu | B64D 27/18 60/39.83 |
| 2009/0188234 A1* | 7/2009 | Suciu | F02C 7/14 60/262 |
| 2009/0288387 A1* | 11/2009 | Baltas | F02K 1/15 60/204 |
| 2010/0193628 A1* | 8/2010 | Welch | B64D 29/06 244/54 |
| 2011/0268560 A1* | 11/2011 | Morvant | B64D 33/06 415/145 |
| 2013/0129483 A1 | 5/2013 | Chiou et al. | |
| 2013/0230391 A1 | 9/2013 | Hurlin et al. | |
| 2013/0319002 A1* | 12/2013 | Sidelkovskiy | F01D 9/065 60/797 |
| 2014/0030087 A1* | 1/2014 | Soria | F02K 1/72 415/213.1 |
| 2014/0234090 A1* | 8/2014 | Hurlin | B64D 29/06 415/182.1 |
| 2014/0319269 A1* | 10/2014 | Scarr | B64D 29/06 244/54 |
| 2015/0098810 A1 | 4/2015 | Soria et al. | |
| 2015/0135875 A1 | 5/2015 | Holmstrom et al. | |
| 2015/0252728 A1* | 9/2015 | Veiga | F01D 25/28 60/796 |
| 2015/0300254 A1* | 10/2015 | Stretton | F02C 7/04 137/15.1 |
| 2015/0322984 A1 | 11/2015 | Ratajac | |
| 2015/0367949 A1* | 12/2015 | Forcier | B64D 29/06 60/796 |
| 2017/0184025 A1* | 6/2017 | Sawyers-Abbott | F02C 7/12 |

FOREIGN PATENT DOCUMENTS

| | | | | |
|---|---|---|---|---|
| GB | 2384827 A | * | 8/2003 | G64D 29/08 |
| GB | 2384827 A | | 8/2003 | |
| GB | 2544554 A | * | 5/2017 | G06F 17/5086 |

OTHER PUBLICATIONS

John M. Welch, "A Perspective on MRO Trends in Advanced Material Repair", Aviation Week and Space Technology MRO Europe Conference Excel Exhibition and Conference Centre, London, UK, Sep. 24, 2013, downloaded from http://events.aviationweek.com/html/meu13/24SEPT_COMPOSITES_SESSION1_JOHN_WELCH.pdf.

* cited by examiner

NACELLE BIFURCATION WITH LEADING EDGE STRUCTURE

BACKGROUND OF THE INVENTION

1. Technical Field

This disclosure relates generally to an aircraft propulsion system and, more particularly, to a leading edge structure for a bifurcation of an aircraft propulsion system nacelle.

2. Background Information

A typical turbofan aircraft propulsion system includes a bifurcation within its bypass flowpath. Various bifurcation configurations are known in the art. While these known bifurcation configurations have various advantages, there is still room in the art for improvement particularly for hybrid inner fixed structures with metal barrels and composite bifurcation panels.

SUMMARY OF THE DISCLOSURE

According to an aspect of the present disclosure, an assembly is provided for an aircraft propulsion system. This assembly includes a tubular inner housing, a tubular outer housing and a bifurcation. The bifurcation includes a leading edge structure structurally connected to the inner housing and the outer housing. The leading edge structure includes a leading edge member and a brace member. The leading edge member forms a leading edge of the bifurcation and extends radially between the inner housing and the outer housing. The brace member is structurally connected to the outer housing and the inner housing. The brace member extends aft away from the leading edge member to the inner housing.

According to another aspect of the present disclosure, another assembly is provided for an aircraft propulsion system. The assembly includes an inner fixed structure barrel, a fan case and a bifurcation. The bifurcation includes a leading edge structure structurally connected to the inner fixed structure barrel and the fan case. The leading edge structure includes a leading edge member. The leading edge member forms a leading edge of the bifurcation and extends radially between the inner fixed structure barrel and the fan case.

The brace member may be structurally connected to the leading edge member, which may or may not provide the structural connection between the brace member and the outer housing.

The assembly may include a core case housed within the inner fixed structure barrel.

The leading edge structure may include a brace member structurally connected to the leading edge member and the inner fixed structure barrel.

The brace member may extend aft away from the leading edge member to the inner fixed structure barrel.

The brace member may be or otherwise include a first brace member. The leading edge structure may also include a second brace member structurally connected to the leading edge member and the inner fixed structure barrel.

The outer housing may be or otherwise include a fan case.

The inner housing may be or otherwise include an inner fixed structure barrel configured to circumscribe a turbine engine core of the aircraft propulsion system.

The inner housing may be or otherwise include a core case.

The brace member may be connected to the leading edge member at a radial outer distal end of the leading edge member.

The leading edge member may have a radial span. The brace member may be connected to the leading edge member along at least a major portion of the radial span.

The leading edge member may have a radial span. The brace member may be connected to the leading edge member at a plurality of points along the radial span.

The leading edge structure may have an overall radial dimension and an overall axial dimension that is greater than the overall radial dimension.

The brace member may be or otherwise include a truss structure, a gusset, a strut and/or a shock.

The brace member may be or otherwise include a first brace member. The leading edge structure may include a second brace member. The second brace member may be structurally connected to the leading edge member and the inner housing. The second brace member may extend aft away from the leading edge member to the inner housing.

The foregoing features and the operation of the invention will become more apparent in light of the following description and the accompanying drawings.

DETAILED DESCRIPTION OF THE INVENTION

Figure 1:
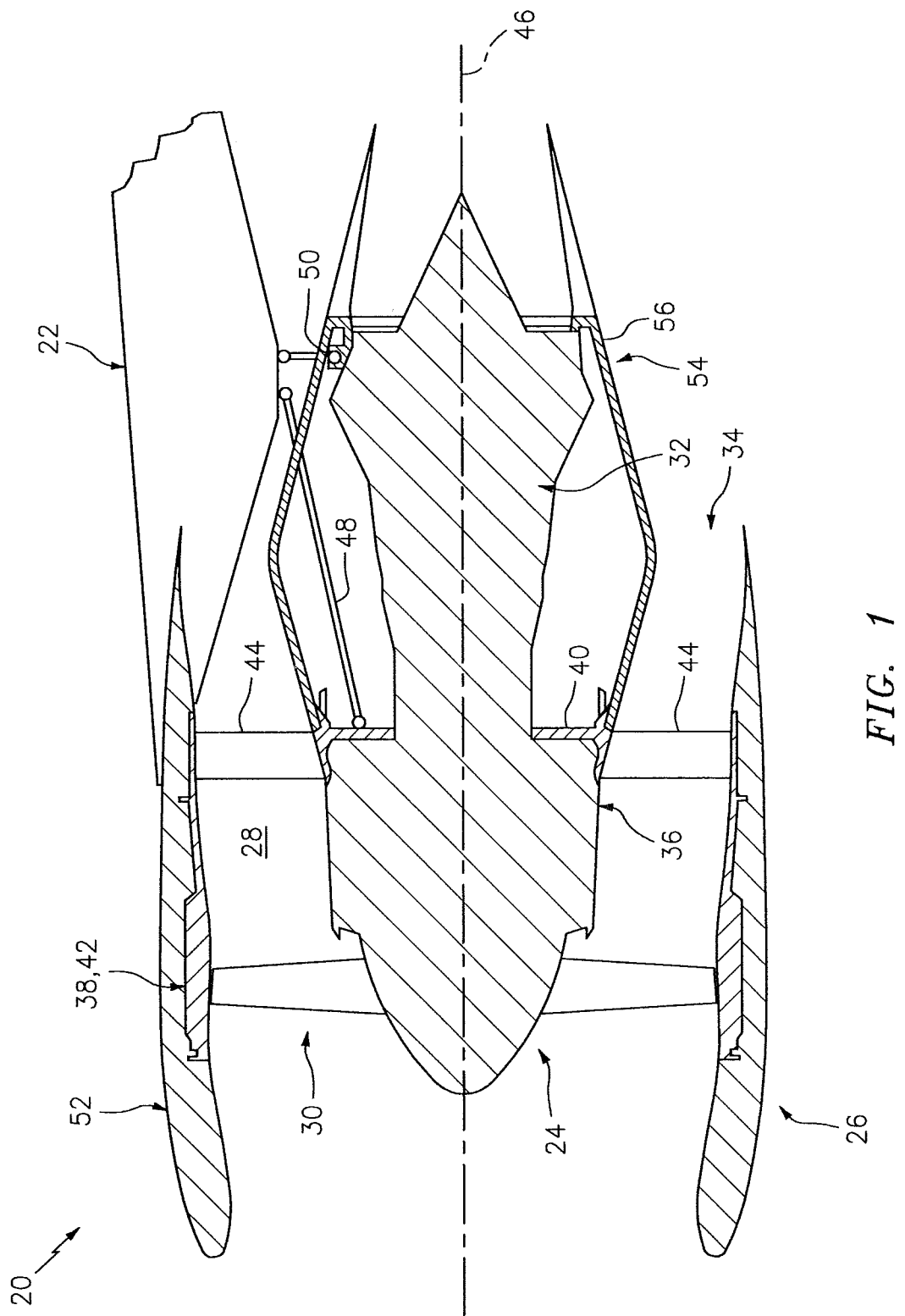
FIG. 1 is a schematic side sectional illustration of an aircraft propulsion system.

FIG. 1 illustrates an aircraft propulsion system 20 for an aircraft such as, but not limited to, a commercial airliner. The propulsion system 20 is mounted and structurally tied to the aircraft through a pylon structure 22. The propulsion system 20 includes a gas turbine engine 24 and a nacelle 26.

The gas turbine engine 24 may be configured as a high-bypass turbofan engine as generally illustrated in FIG. 1, or any other type of gas turbine engine with multiple flowpaths. The gas turbine engine 24 of FIG. 1 includes a bypass flowpath 28, a fan section 30 and a turbine engine core 32. The bypass flowpath 28 generally circumscribes the engine core 32, and extends axially along the engine core 32 from the fan section 30 to a bypass nozzle 34. The fan section 30 is configured to propel a majority of incoming engine airflow into the bypass flowpath 28. The bypass flowpath 28 routes this propelled airflow (a bypass airflow) out of the propulsion system 20 through the bypass nozzle 34, thereby bypassing the engine core 32. The bypass airflow may provide a majority (e.g., more than 75%) of engine thrust in the case of a high-bypass turbofan engine.

The gas turbine engine 24 includes an inner case structure 36 and an outer case structure 38. The inner case structure 36 is configured to house the engine core 32, which includes a compressor section, a combustor section and a turbine section. The inner case structure 36 may be configured from a plurality interconnected axial segments (core cases), including an intermediate case 40.

The outer case structure 38 is configured to house at least the fan section 30. The outer case structure 38 of FIG. 1, for example, is configured as or may otherwise include a fan case 42. This fan case 42 circumscribes the fan section 30. The fan case 42 also circumscribes and axially overlaps a portion of the inner case structure 36, thereby forming a forward portion of the bypass flowpath 28.

The fan case 42 and, thus, the outer case structure 38 are mounted and structurally tied to the inner case structure 36 by a plurality of fan exit guide vanes 44. These guide vanes 44 are arranged in an annular array about an axial centerline 46 of the gas turbine engine 24. Each of the guide vanes 44 extends radially between the fan case 42 and the intermediate case 40 through the bypass flowpath 28. Each of the guide vanes 44 is connected to the fan case 42 and the intermediate case 40.

The pylon structure 22 is mounted to the fan case 42 and the inner case structure 36. A forward portion of the pylon structure 22 of FIG. 1, for example, is connected to an aft end of the fan case 42 through a forward mount (not shown in FIG. 1). An intermediate portion of the pylon structure 22 of FIG. 1 is connected to the inner case structure 36 through thrust links 48 and an aft mount 50. The thrust links 48 may be connected to the intermediate case 40. The aft mount 50 may be connected to an aft segment of the inner case structure 36; e.g., a turbine exhaust case or a mid-turbine case.

The nacelle 26 is configured to provide an aerodynamic housing for the gas turbine engine 24 and the pylon structure 22 within the bypass flowpath 28. The nacelle 26 includes an outer nacelle structure 52 and an inner nacelle structure 54. The outer nacelle structure 52 is configured to house and provide an aerodynamic covering for the fan section 30 and the outer case structure 38 (e.g., the fan case 42). The outer nacelle structure 52 also circumscribes and axially overlaps a portion of the inner nacelle structure 54, thereby forming an aft portion of the bypass flowpath 28. The outer nacelle structure 52 and the inner nacelle structure 54 also collectively form the bypass nozzle 34.

Figure 2:
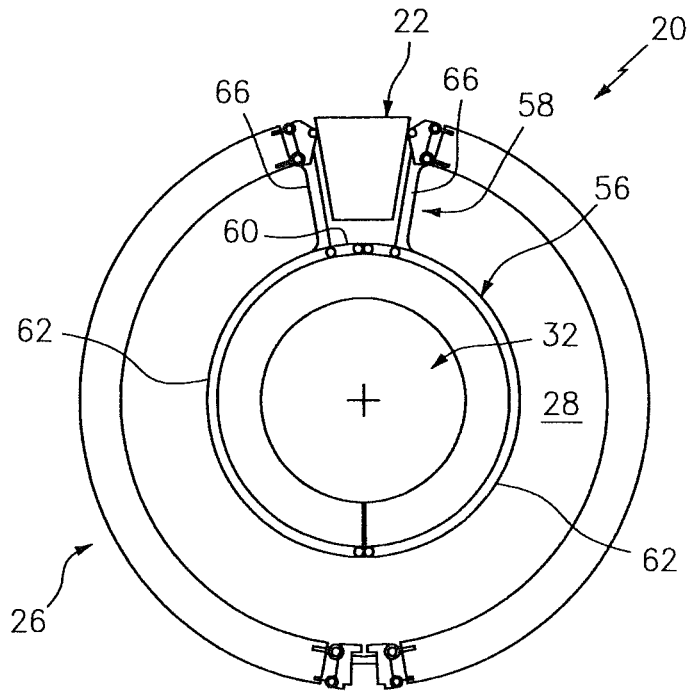
FIG. 2 is a schematic cross-sectional illustration of select components of the propulsion system of FIG. 1 with its nacelle in a closed position.
Figure 3:
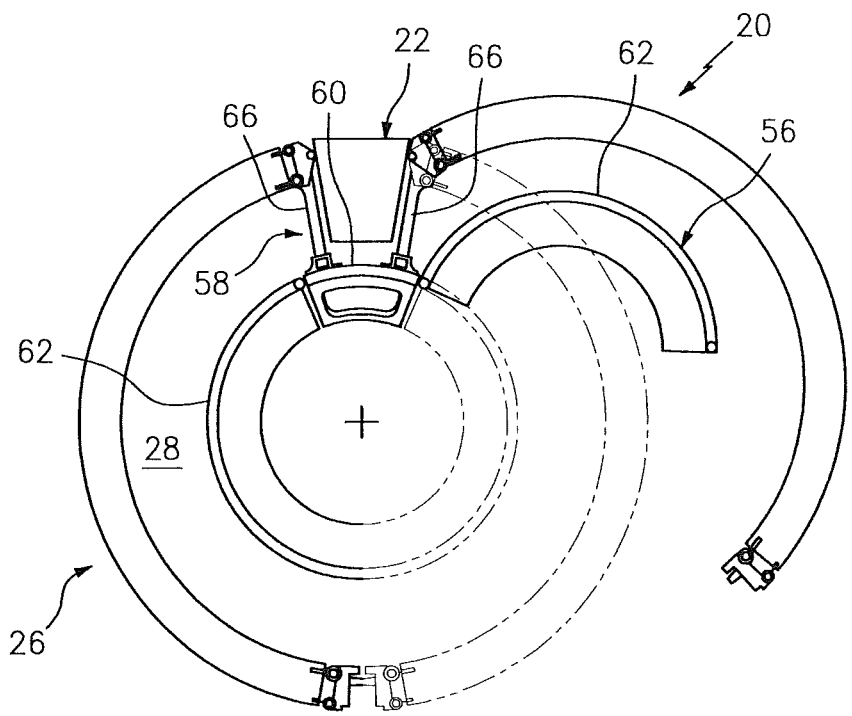
FIG. 3 is a schematic cross-sectional illustration of select components of the propulsion system of FIG. 1 with its nacelle in a partially open position.

The inner nacelle structure 54, which may also be referred to as an "inner fixed structure" or "IFS", includes an inner fixed structure ("IFS") barrel 56 and at least one bifurcation 58 (see FIG. 2); e.g., a sole upper bifurcation. The IFS barrel 56 may be configured as a full barrel as shown in FIG. 2. The IFS barrel 56 of FIG. 2, for example, is a full hoop body that circumscribes the engine core 32. The IFS barrel 56 of FIG. 2 includes a stationary barrel portion 60 and one or more barrel doors 62. The barrel doors 62 are positioned on either side of the stationary barrel portion 60 and pivotally connected on opposing sides of the stationary barrel portion 60 as shown in FIG. 3. At least when the barrel doors 62 are closed as shown in FIG. 2, the IFS barrel 56 is structurally tied to the inner case structure 36 and thereby provides a backbone or exoskeleton for the inner case structure 36. The present disclosure, however, is not limited to the specific exemplary inner nacelle structure configuration described above. The present disclosure is also not limited to a full barrel configuration as described later below.

Figure 4:
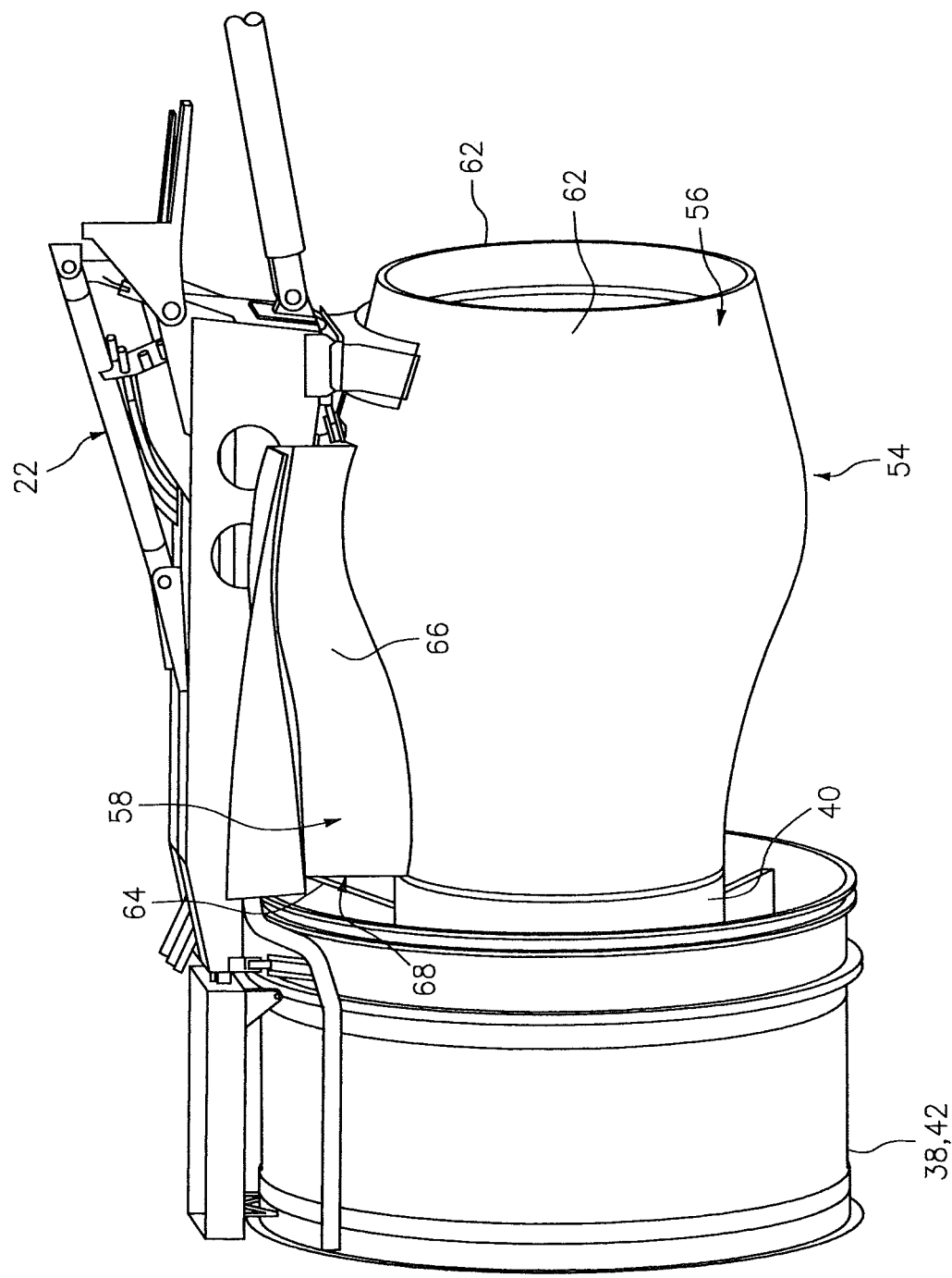
FIG. 4 is a perspective illustration of select components of the propulsion system of FIG. 1.

Referring to FIG. 4, the bifurcation 58 is configured to provide an aerodynamic housing for at least a portion of the pylon structure 22 within the bypass flowpath 28. The bifurcation 58 extends axially along the centerline 46 within the bypass flowpath 28 from an axially forward and upstream leading edge 64 to an aft end (not shown). The bifurcation 58 includes opposing bifurcation side panels 66 (see also FIG. 3) and a leading edge structure 68. Each of the bifurcation side panels 66 extends radially from the IFS barrel 56 to the outer nacelle structure 52 (see also FIGS. 2 and 3). Each of the bifurcation side panels 66 is engaged (e.g., attached, in touching contact and/or sealed) with the leading edge structure 68, and extends axially aft from the leading edge structure 68 along the pylon structure 22.

Figure 5:
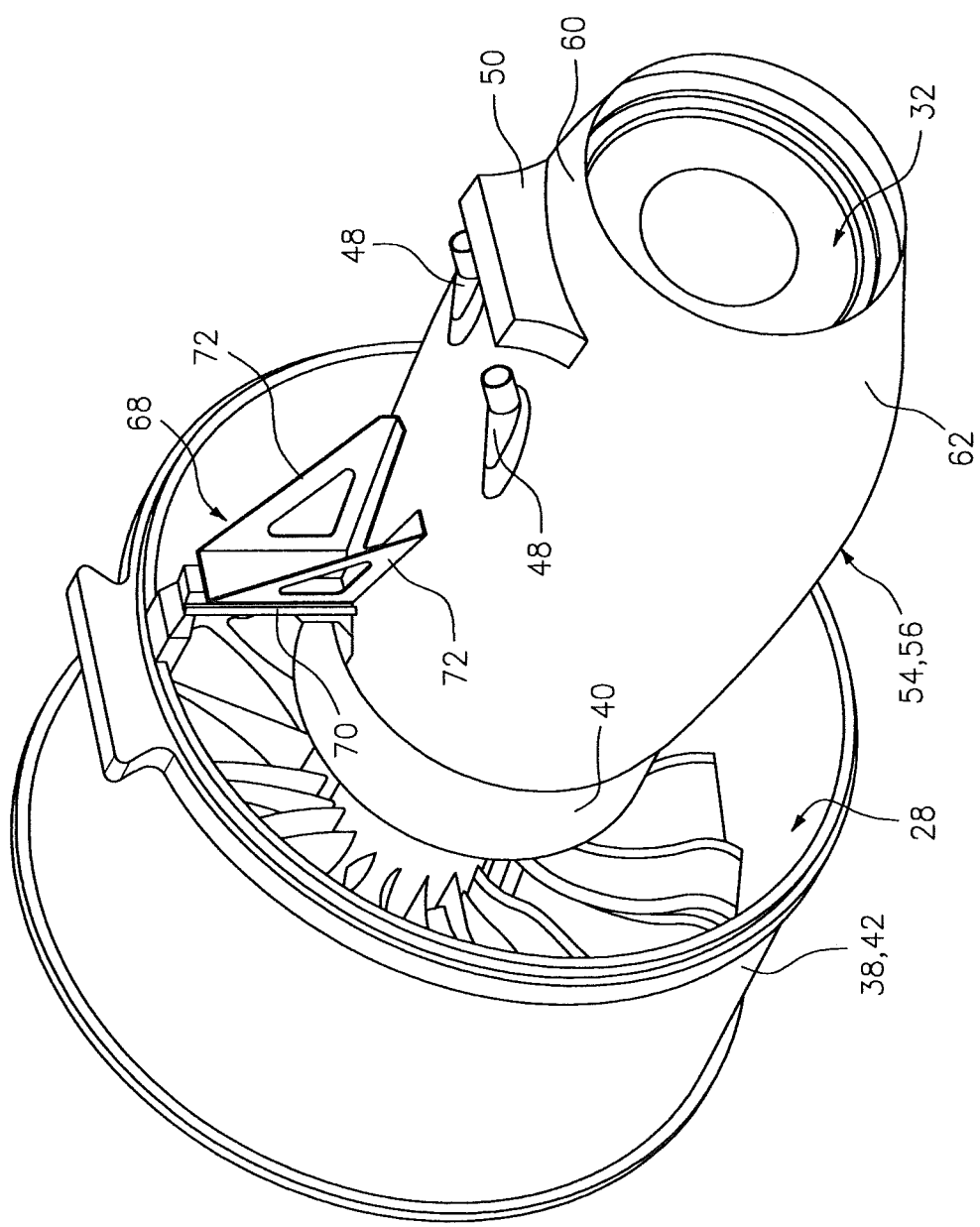
FIG. 5 is another perspective illustration of select components of the propulsion system of FIG. 1.

Referring to FIG. 5, the leading edge structure 68 is configured to split the bypass airflow and direct that split bypass airflow towards the sides of the bifurcation 58. The leading edge structure 68 is also configured to structurally tie and thereby provide a structural backbone between a tubular inner housing and a tubular outer housing. The tubular inner housing of FIG. 5 is the inner nacelle structure 54 and, more particularly, the IFS barrel 56. The tubular outer housing of FIG. 5 is the outer nacelle structure 52 and, more particularly, the fan case 42. The tubular inner and outer housings of the present disclosure, however, are not limited to the foregoing exemplary embodiment. For example, in other embodiments, the tubular inner housing may be configured as the inner case structure 36; e.g., a core case.

Referring again to FIG. 5, the leading edge structure 68 includes a leading edge member 70 (e.g., an eagle beak) and one or more brace members 72. The leading edge member 70 and the one or more brace members 72 may be cast, machined or otherwise formed integral with one another. Alternatively, the leading edge member 70 may be formed discrete from the one or more brace members 72, but then structurally connected to the one or more brace members 72. The term "structurally connected" herein may describe a connection between at least two bodies that is both rigid and enables the transfer of relatively large loads between the bodies. Such a structural connection is in contrast to an engagement which merely is provided to seal a gap between at least two bodies and/or locate and hold one of the bodies relative to another one of the bodies. In such an engagement, relatively large loads cannot be transferred between the bodies.

The leading edge member 70 is configured to form the leading edge 64 of the bifurcation 58. The leading edge member 70 extends radially along a radial span thereof through the bypass flowpath 28 between the fan case 42 and the intermediate case 40. The leading edge member 70 may also be structurally connected to the fan case 42 and/or the intermediate case 40 through, for example, rigid bolted connections. Of course, various other rigid structural connections are known in the art and the present disclosure is not limited to any particular ones thereof.

Each of the brace members 72 is configured to increase the structural stiffness of the leading edge member 70. More particularly, since the leading edge member 70 alone is generally cantilevered from the fan case 42 and the intermediate case 40, the brace members 72 are configured to provide one or more additional anchor points to turn the otherwise cantilevered structure into a rigid structural truss. Each of the brace members 72 of FIG. 5, for example, is configured as an apertured gusset structurally connected to and extending between the leading edge member 70 and the IFS barrel 56. Each of the brace members 72 extends radially along and is connected to the leading edge member 70 along its radial span. Each of the brace members 72 also extends axially aft from the leading edge member 70 along and is connected to the IFS barrel 56. The brace members 72 of FIG. 5 are arranged in a V-configuration (e.g., angularly positioned relative to the centerline 46) so as to also provide lateral support.

With the foregoing configuration, the leading edge structure 68 is operable to react axial and radial and, in the embodiment of FIG. 5, lateral loads between the fan case 42 (e.g., tubular outer housing) and the components 40 and 56 (e.g., the tubular inner housing). This enables the leading edge structure 68 to prevent or reduce relative movement between the fan case 42 and the engine core 32.

The leading edge structure 68 may also enable configuration of the nacelle 26 as an O-duct nacelle as best shown in FIGS. 2 and 4. For example, by increasing the structural integrity/stiffness of the bifurcation 58 and, thus, prevent or reduce relative movement between the fan case 42 and the engine core 32, the nacelle 26 may be configured without a second (e.g., lower) bifurcation. Such a second bifurcation may be included on a nacelle with a D-duct/C-duct configuration, and is provided to provide further structural support between the engine core 32 and the fan case 42. An O-duct configuration may be operable to allow more unobstructed flow through the bypass flowpath 28. An O-duct configuration may also reduce weight of the nacelle.

Figure 6:
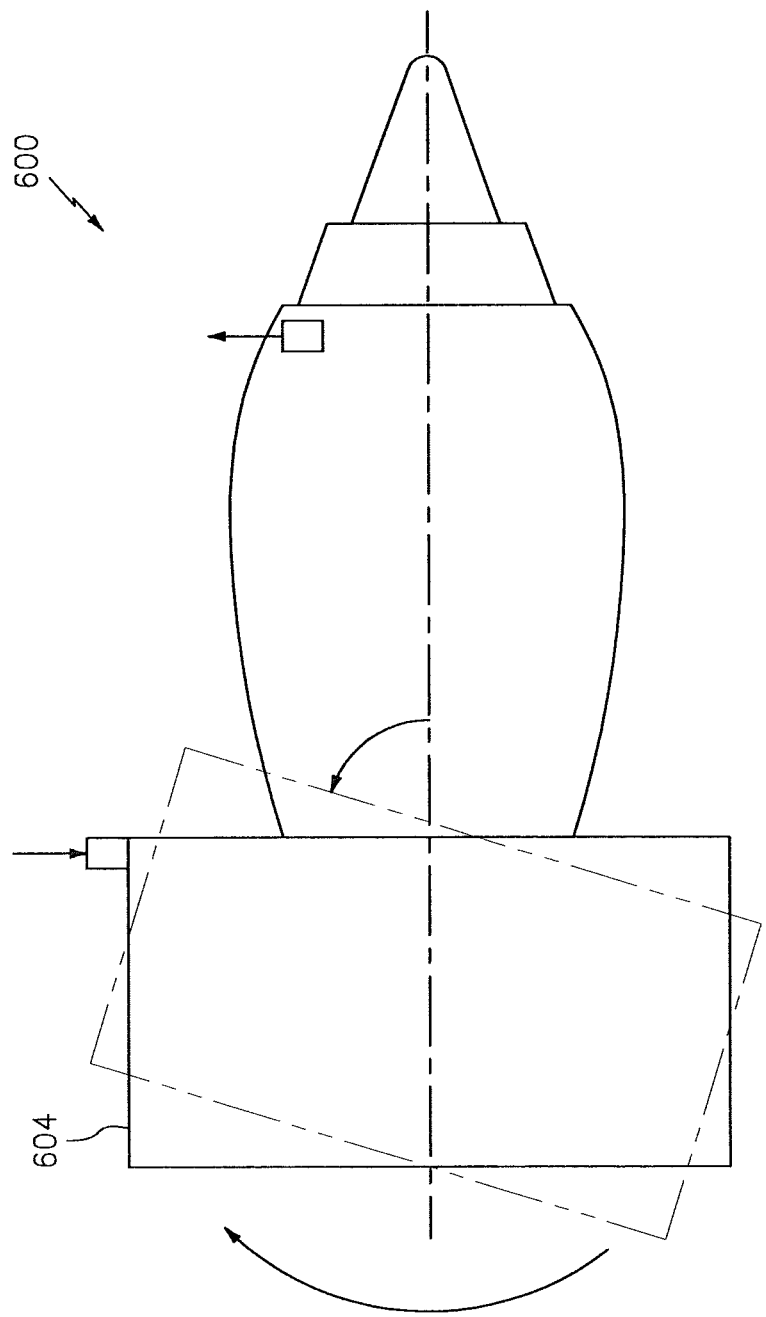
FIG. 6 is a side schematic illustration of a prior art aircraft propulsion system.
Figure 7:
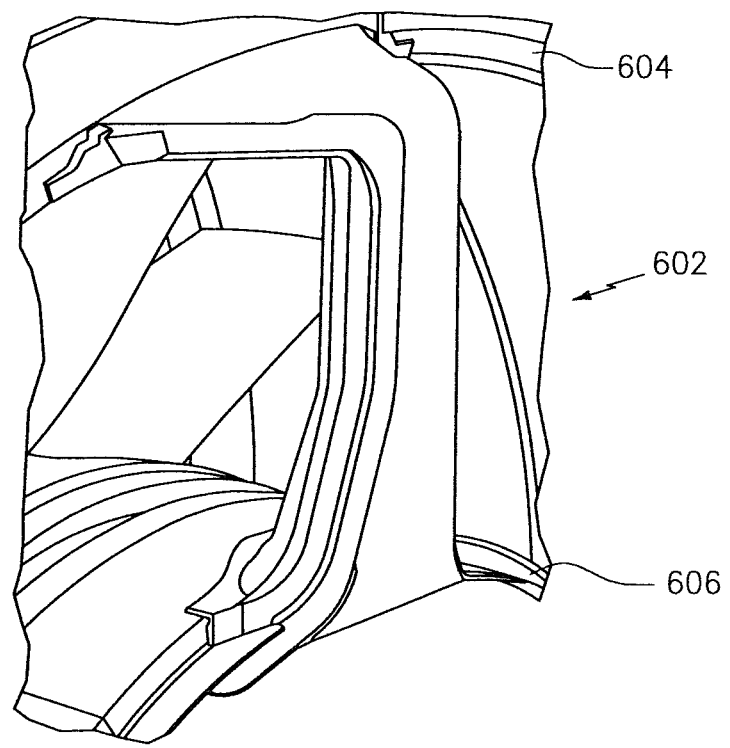
FIGS. 7-10 are perspective illustrations of prior art leading edge elements for the aircraft propulsion system of FIG. 6.
Figure 8:
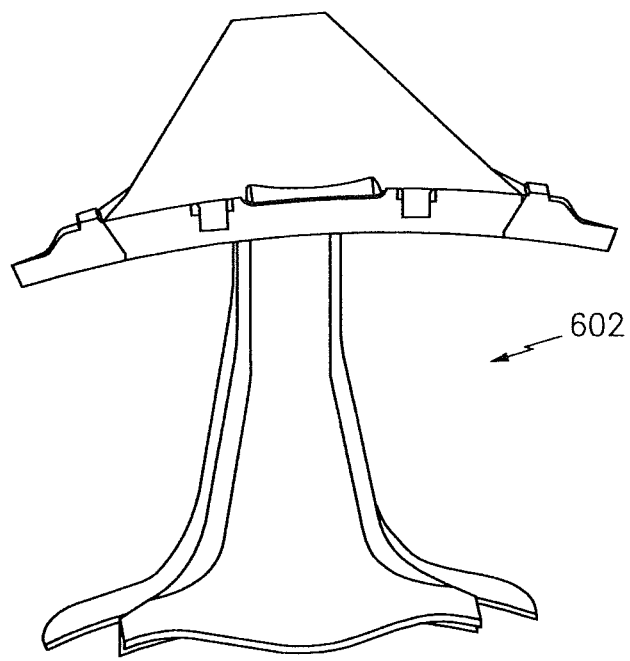
Figure 9:
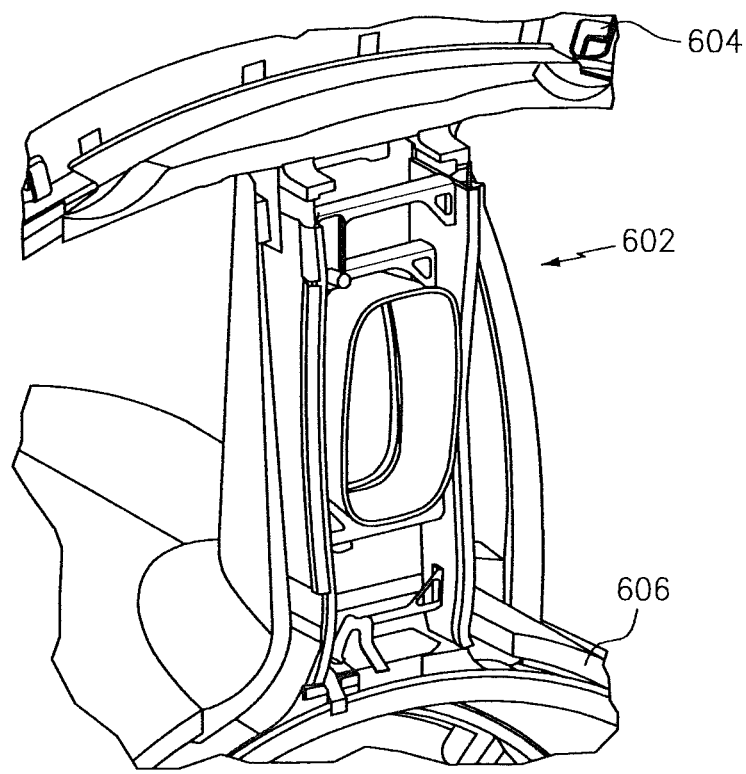
Figure 10:
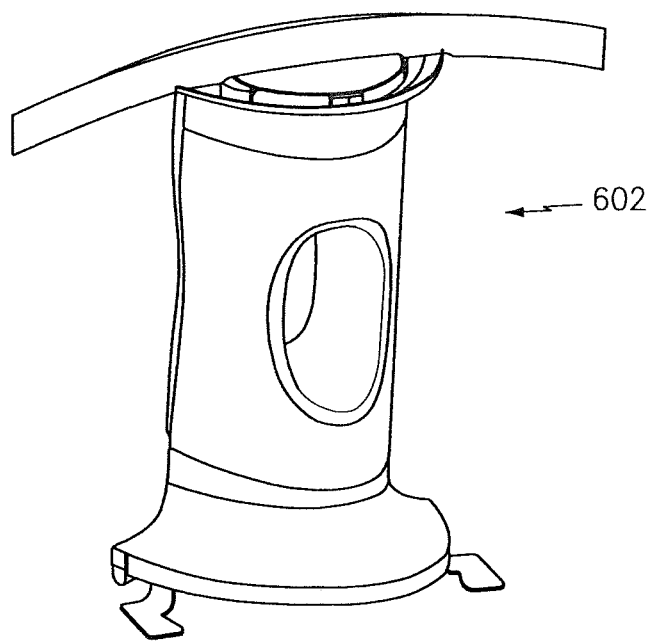

In contrast to the foregoing, referring to FIG. 6, relative movement may occur where an aircraft propulsion system 600 is configured with a prior art eagle beak/leading edge element 602 (see FIGS. 7-10) instead of the leading edge structure 68 of the present disclosure. While the prior art leading edge elements 602 of FIGS. 7-10 are mounted to a fan case 604 and an intermediate case 606, the connection between these bodies 602, 604 and 606 is an engagement as described above and configured to locate the leading edge element 602 relative to the cases 604 and 606 as opposed to transfer loads between the bodies 602, 604 and 606. Furthermore, as shown in FIGS. 7-10, the prior art leading edge elements 602 are generally longitudinal bodies without any aft axial bracing.

Figure 11:
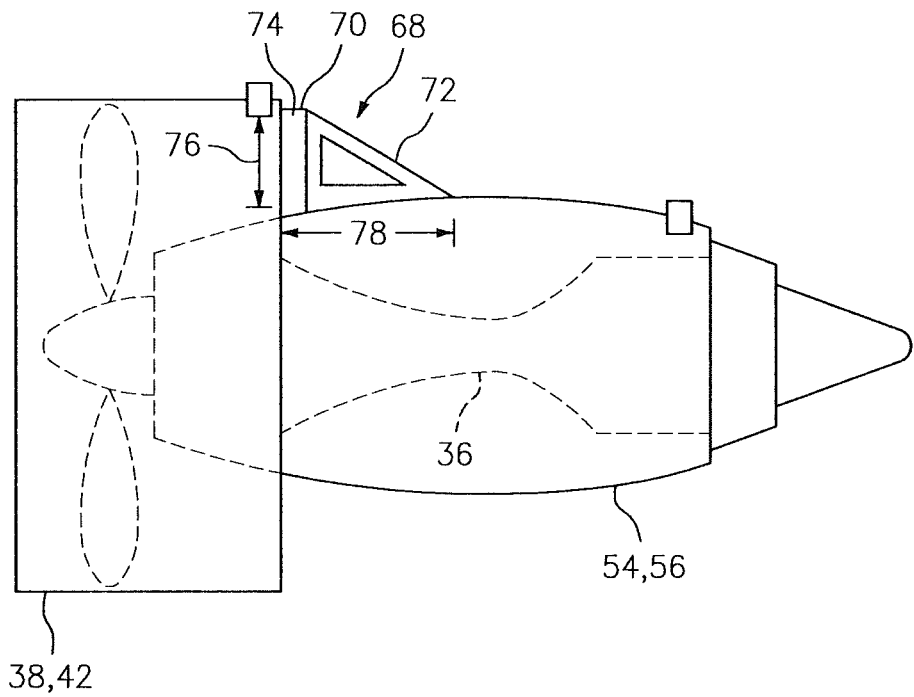
FIGS. 11-15 are schematic side illustrations of the propulsion system of FIG. 1 with alternative embodiment leading edge structures.
Figure 12:
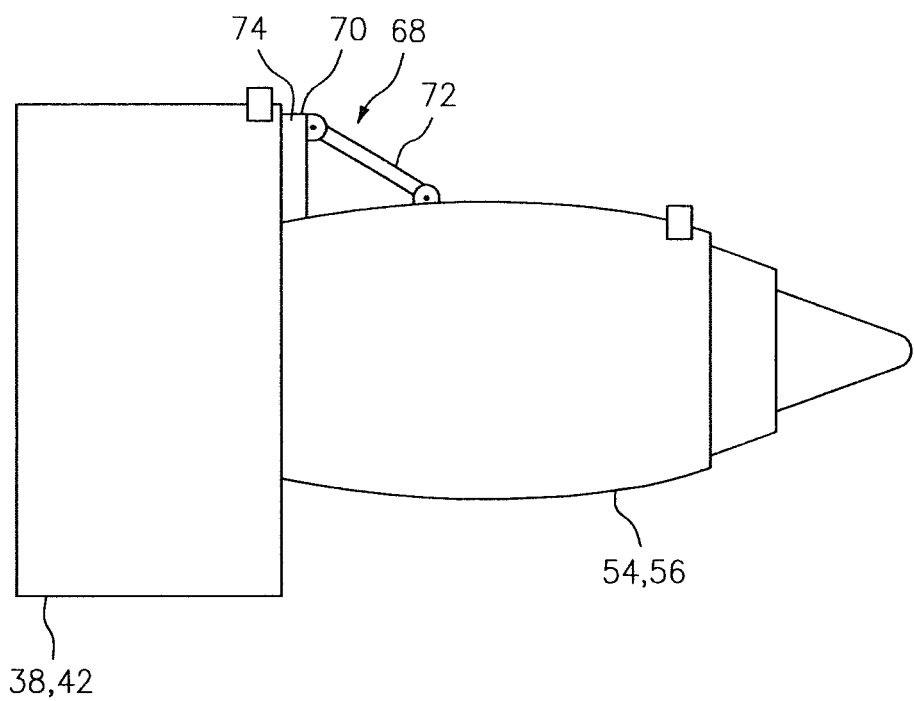
Figure 13:
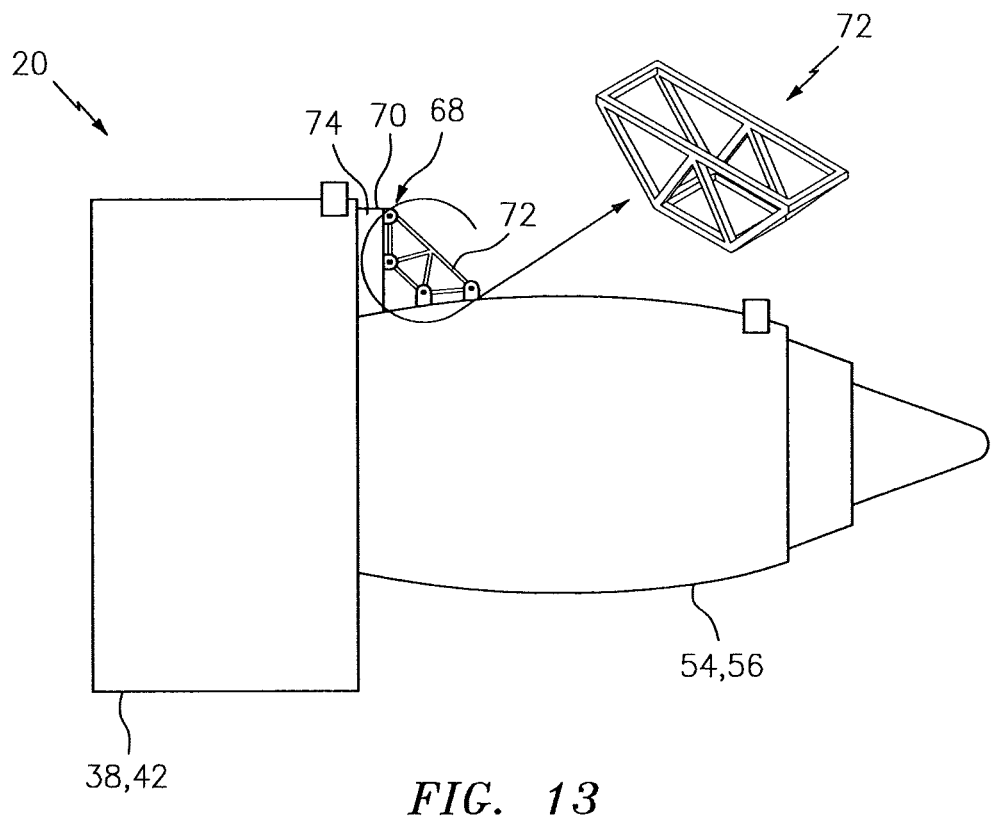
Figure 14:
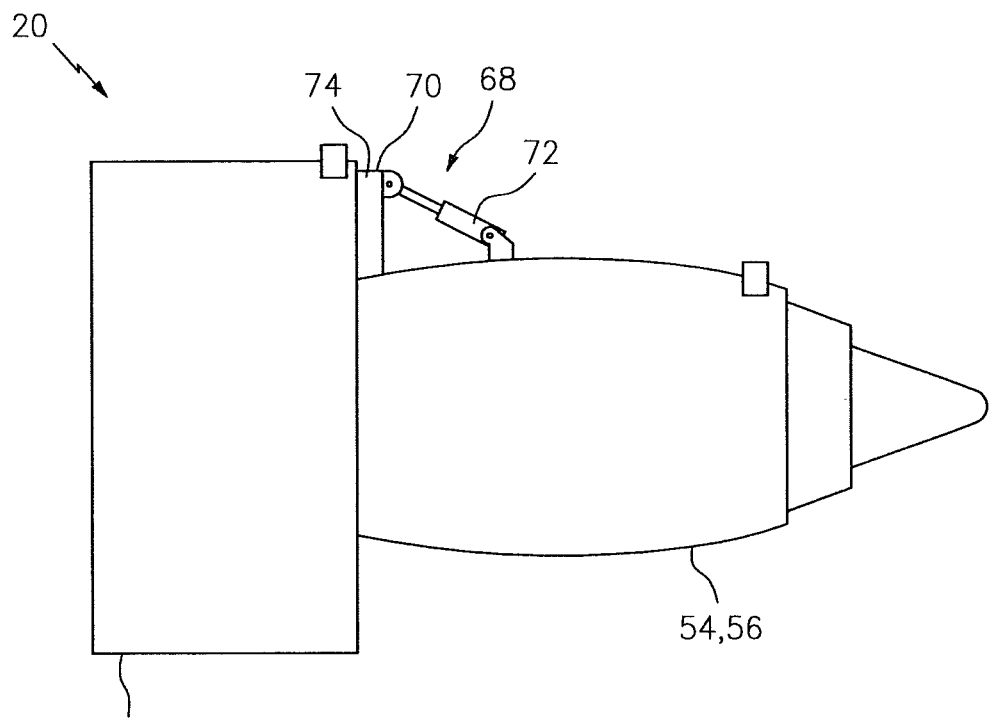

The leading edge structure 68 of the present disclosure may have various configurations other than the exemplary one described above with reference to FIG. 5. Non-limiting examples of such configurations are shown in FIGS. 11-14. Referring to FIG. 11, the leading edge structure 68 is configured with a single brace member; here, an apertured gusset. Of course, in other embodiments, the gusset may be solid or non-apertured. Referring to FIG. 12, each brace member 72 is configured as a strut or rigid link. Referring to FIG. 13, each brace member 72 is configured as a rigid truss structure. Referring to FIG. 14, each brace member 72 is configured as a shock, which may also be configured as a damper.

In some embodiments, each brace member 72 may be structurally connected to the leading edge member 70 radially along at least a major portion (e.g., more than 50%) or substantially all of the radial span as shown in in FIGS. 5 and 11. Similarly, in some embodiments, each brace member 72 may also or alternatively be structurally connected to the IFS barrel 56 (e.g., the tubular inner housing) axially along the IFS barrel 56 (e.g., the tubular inner housing) as shown in in FIGS. 5 and 11.

In some embodiments, each brace member 72 may be structurally connected to the leading edge member 70 at a plurality of points radially along the radial span as shown in in FIG. 13. Similarly, in some embodiments, each brace member 72 may also or alternatively be structurally connected to the IFS barrel 56 (e.g., the tubular inner housing) at a plurality of points axially along the IFS barrel 56 (e.g., the tubular inner housing) as shown in in FIG. 13.

In some embodiments, each brace member 72 may be structurally connected to the leading edge member 70 at a single point radially along the radial span as shown in in FIGS. 12 and 14. Similarly, in some embodiments, each brace member 72 may also or alternatively be structurally connected to the IFS barrel 56 (e.g., the tubular inner housing) at a single point axially along the IFS barrel 56 (e.g., the tubular inner housing) as shown in in FIGS. 12 and 14.

In some embodiments, referring to FIGS. 5 and 11-14, each brace may be structurally connected to the leading edge member 70 at (e.g., on, adjacent or proximate) a radial outer distal end 74 of the leading edge member 70.

Referring to FIG. 11, the leading edge structure 68 has an overall radial dimension 76 (e.g., the radial span of the leading edge member 70) and an overall axial dimension 78. In some embodiments, the overall axial dimension 78 may be greater than the overall radial dimension 76. However, in other embodiments, the overall axial dimension 78 may be substantially equal to or less than the overall radial dimension 76 depending upon how much structural rigidity the leading edge structure 68 is needed to provide.

Figure 15:
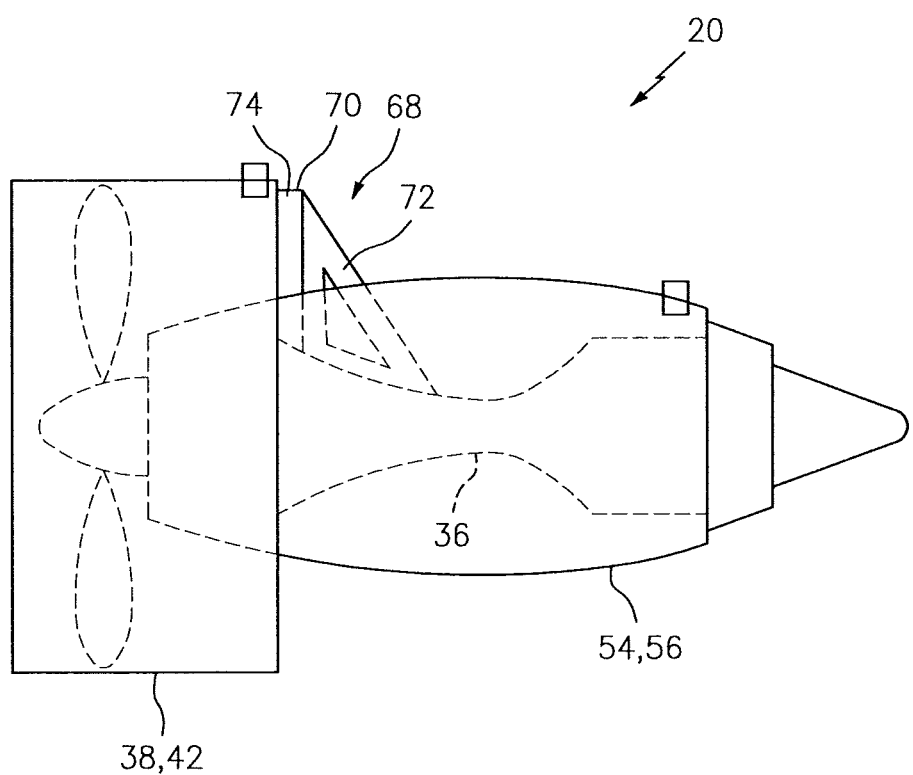

In some embodiments, referring to FIG. 15, the tubular inner housing may be configured as a core case included in the inner case structure 36. Thus, each brace member 72 is structurally connected to that core case included in the inner case structure 36. In such embodiments, the IFS barrel 56 may include one or more apertures (e.g., slots, holes, etc.) through which the brace member(s) may extend. Alternatively, the IFS barrel 56 may be configured to only extend partially around the engine core 32.

In some embodiments, each brace member 72 may be structurally connected to the fan case 42 (e.g., the tubular outer housing) through the leading edge member 70. However, the brace member 72 may also or alternatively be structurally connected to the fan case 42 (e.g., the tubular outer housing) in another manner. For example, the brace member 72 may be directly structurally connected to the fan case via, for example, a bolted flange connection. Alternatively, the brace member 72 may be structurally connected to the fan case via another intermediate structure.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. An assembly for an aircraft propulsion system, comprising:
   a tubular inner housing;
   a tubular outer housing; and
   a bifurcation comprising a leading edge structure structurally connected to the inner housing and the outer housing, the leading edge structure comprising a leading edge member and a pair of brace members arranged in a V-configuration;

the leading edge member forming a leading edge of the bifurcation and extending radially between the inner housing and the outer housing; and each of the brace members structurally connected to the outer housing and the inner housing, and each of the brace members connected to the leading edge member and extending aft away from the leading edge member to the inner housing.

2. The assembly of claim 1, wherein the outer housing comprises a fan case.

3. The assembly of claim 2, wherein the inner housing comprises an inner fixed structure barrel configured to circumscribe a turbine engine core of the aircraft propulsion system.

4. The assembly of claim 2, wherein the inner housing comprises a core case.

5. The assembly of claim 1, wherein a first of the brace members is connected to the leading edge member at a radial outer distal end of the leading edge member.

6. The assembly of claim 1, wherein the leading edge member has a radial span, and a first of the brace members is connected to the leading edge member along at least a major portion of the radial span.

7. The assembly of claim 1, wherein the leading edge structure has an overall radial dimension and an overall axial dimension that is greater than the overall radial dimension.

8. The assembly of claim 1, wherein a first of the brace members comprises a truss structure.

9. The assembly of claim 1, wherein a first of the brace members comprises a gusset.

10. The assembly of claim 1, wherein a first of the brace members comprises a strut.

11. The assembly of claim 1, wherein a first of the brace members comprises a shock.

* * * * *